United States Patent
Enomoto et al.

(10) Patent No.: US 11,285,889 B2
(45) Date of Patent: Mar. 29, 2022

(54) HARNESS GUIDE

(71) Applicant: SUMITOMO WIRING SYSTEMS, LTD., Mie (JP)

(72) Inventors: Tetsushi Enomoto, Mie (JP); Hiroshi Inoue, Mie (JP); Hiroki Uno, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/500,653

(22) PCT Filed: Mar. 16, 2018

(86) PCT No.: PCT/JP2018/010523
§ 371 (c)(1),
(2) Date: Oct. 3, 2019

(87) PCT Pub. No.: WO2018/186151
PCT Pub. Date: Oct. 11, 2018

(65) Prior Publication Data
US 2020/0108783 A1 Apr. 9, 2020

(30) Foreign Application Priority Data

Apr. 5, 2017 (JP) .............................. JP2017-075109

(51) Int. Cl.
*B60R 16/02* (2006.01)

(52) U.S. Cl.
CPC ................................. *B60R 16/0215* (2013.01)

(58) Field of Classification Search
CPC ... B60R 16/0215; B60R 16/027; H02G 11/00; F16G 13/16

(Continued)

(56) References Cited

U.S. PATENT DOCUMENTS 6,695,014 B2 * 2/2004 Blase .................... H02G 11/006
138/120
7,017,328 B2 * 3/2006 Komiya ............... H02G 11/006
59/78.1

(Continued)

FOREIGN PATENT DOCUMENTS

| JP | 2013-067351 | 4/2013 |
| WO | 2013/046776 | 4/2013 |
| WO | 2016/152585 | 9/2016 |

OTHER PUBLICATIONS

Official Communication issued in International Bureau of WIPO Patent Application No. 2018/010523, dated Apr. 24, 2018.

*Primary Examiner* — Muhammad Ijaz
(74) *Attorney, Agent, or Firm* — Greenblum & Bernstein, P.L.C.

(57) ABSTRACT

A harness guide includes: a plurality of first link members each including a first side plate configured to face one side face of a wire harness and a pair of upper and lower first coupling plates that extend from the first side plate and are configured to face an upper and lower faces of the wire harness, and a plurality of second link members each including a second side plate configured to face another side face of the wire harness and a pair of upper and lower second coupling plates that extend from the second side plate and are configured to face the upper and lower faces of the wire harness, and an elongated housing space for housing the wire harness is formed by alternately arranging the plurality of first link members and the plurality of second link members and coupling the first coupling plates and the second coupling plates.

10 Claims, 13 Drawing Sheets

(58) Field of Classification Search
USPC .......................................................... 248/68.1
See application file for complete search history.

(56) References Cited

U.S. PATENT DOCUMENTS

| | | | | |
|---|---|---|---|---|
| 7,040,081 | B2* | 5/2006 | Komiya | F16G 13/16 |
| | | | | 59/78.1 |
| 7,174,702 | B2* | 2/2007 | Ikeda | H02G 11/006 |
| | | | | 59/78.1 |
| 2003/0136456 | A1* | 7/2003 | Blase | F16G 13/16 |
| | | | | 138/120 |
| 2004/0188128 | A1* | 9/2004 | Ikeda | F16G 13/16 |
| | | | | 174/74 A |
| 2007/0228227 | A1* | 10/2007 | Utaki | H02G 11/006 |
| | | | | 248/68.1 |
| 2009/0266046 | A1* | 10/2009 | Komiya | F16G 13/16 |
| | | | | 59/78.1 |
| 2013/0075128 | A1* | 3/2013 | Kaihotsu | H02G 3/0475 |
| | | | | 174/68.3 |
| 2014/0238740 | A1* | 8/2014 | Inoue | B60R 16/0215 |
| | | | | 174/72 A |
| 2017/0066393 | A1* | 3/2017 | Inoue | H02G 3/0406 |
| 2018/0051773 | A1 | 2/2018 | Komiya | |
| 2020/0108783 | A1* | 4/2020 | Enomoto | B60R 16/0215 |

* cited by examiner

HARNESS GUIDE

TECHNICAL FIELD

The present invention relates to a harness guide.

BACKGROUND ART

Patent Document 1 discloses a harness guide used in a slide door of a vehicle. The harness guide is formed by coupling a plurality of rectangular cylindrical link members in a row, and a housing space for housing a wire harness is formed inside the harness guide.

CITATION LIST

Patent Documents

Patent Document 1: JP 2013-67351A

SUMMARY OF INVENTION

Technical Problem

When the harness guide is attached to a wire harness, the wire harness is inserted from one opening end of the housing space into the housing space in a state where the plurality of link members are coupled. However, if the housing space is made very small, when the wire harness is inserted into the housing space, a leading end portion in an inserting direction of the wire harness tends to interfere with an inner face of the housing space, and thus the workability is decreased. As such, there is a limit in making the housing space narrower to reduce the space taken up by the harness guide.

In addition, a synthetic resin is used as the material of the link members of the above-mentioned harness guide. The link members in a coupled state come in sliding contact with each other along with opening and closing of the slide door. If the link members that are in sliding contact with each other are made of the same synthetic resin material, there is a concern that noise will be generated at a time of the sliding contact caused by friction due to intermolecular forces.

A first aspect of the present invention has been made in view of the above-described circumstances, and an object thereof is to achieve a reduction of space taken up by a harness guide. A second aspect of the present invention has been made in view of the above-described circumstances, and an object thereof is to suppress noise.

Solution to Problem

A first aspect of the present invention includes:
a plurality of first link members each including a first side plate that is configured to face one side face of a wire harness and a pair of upper and lower first coupling plates that extend from the first side plate and that are configured to face an upper and lower faces of the wire harness, and
a plurality of second link members each including a second side plate that is configured to face another side face of the wire harness and a pair of upper and lower second coupling plates that extend from the second side plate and that are configured to face the upper and lower faces of the wire harness, and
an elongated housing space for housing the wire harness is formed by alternately arranging the plurality of first link members and the plurality of second link members along an axial direction of the wire harness and coupling the first coupling plates and the second coupling plates so as to be capable of being relatively displaced around vertical shafts.

A second aspect of the present invention includes:
a plurality of first link members that are configured to face an outer face of a wire harness, and
a plurality of second link members that are configured to face the outer face of the wire harness,
an elongated housing space for housing the wire harness is formed by arranging the plurality of first link members and the plurality of second link members alternately along an axial direction of the wire harness and coupling the first link members and the second link members so as to be capable of relative displacement around vertical shafts, and
the first link members and the second link members are made of different kinds of synthetic resins material.

Advantageous Effects of Invention

According to the first aspect of the present invention, when the harness guide is attached to the wire harness, only either of the first link members and the second link members are placed in a jig or the like, and the wire harness is fitted into the set link members in the direction intersecting the axis of the wire harness. Thereafter, the other link members may be coupled to the set link members. When fitting the wire harness into the link members, there is no risk that an end portion of the wire harness will interfere with the inner face of the housing space, and thus the size of link members can be set to a size corresponding to the outer diameter of the wire harness. Accordingly, it is possible to make the housing space narrower and achieve reduction of space taken up by the harness guide.

According to the second aspect of the present invention, since the first link members and the second link members are made of different kinds of synthetic resins, even when the first link members and the second link members come in sliding contact with each other when being relatively displaced, friction due to intermolecular forces is small, and thus the noise generated at the time of the sliding contact can be suppressed.

DESCRIPTION OF EMBODIMENTS

Embodiment of First Aspect of Invention

Figure 1:
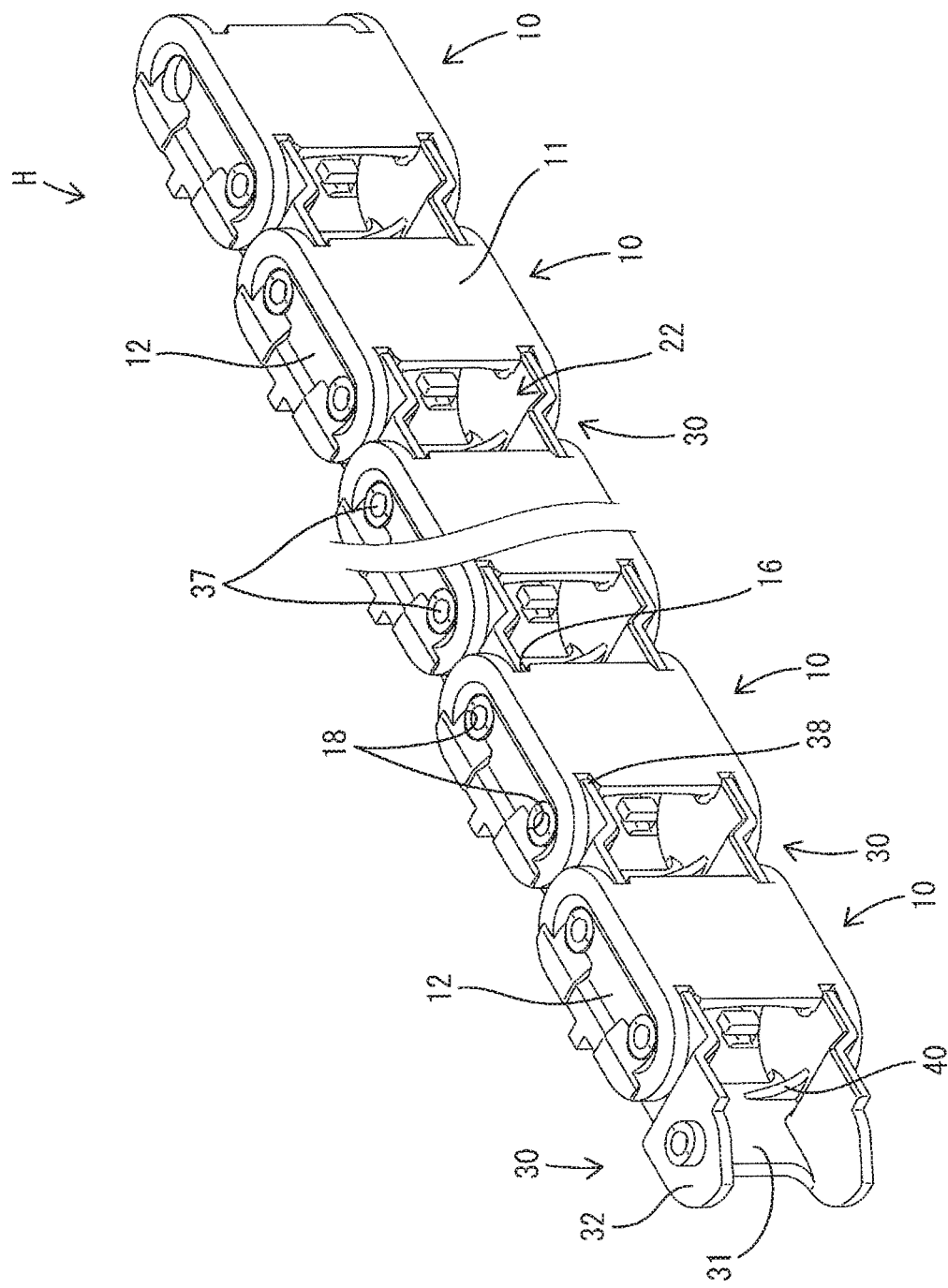
FIG. 1 is a perspective view of a harness guide according to a first embodiment viewed from a first side plate side.

In a first aspect of the present invention, a configuration is also possible where the first coupling plates are placed on outer faces of the second coupling plates, and the first side plate is provided with a displacement restricting portion that abuts against the second coupling plates so as to restrict displacement of the second coupling plates toward an inner face. With this configuration, even if a pressing force acting in the vertical direction is applied on the outer face of the harness guide, the displacement restricting portion restricts displacement of the second coupling plates toward the inner face, and thus displacement of the first coupling plates, which are placed on the outer faces of the second coupling plates, toward the inner face, is also restricted. In this manner, deformation of the harness guide by being crushed in the vertical direction can be prevented.

In the first aspect of the present invention, a configuration is also possible where the displacement restricting portion is formed by a restricting projection protruding from an inner face of the first side plate, and displacement of the second coupling plates toward the inner face is restricted by outer edge portions of the second coupling plates being engaged with the restricting projection.

In the first aspect of the present invention, a configuration is also possible where the restricting projection is shaped like a rib and extends along the axial direction of the wire harness, and the two second coupling plates can abut against the two end portions of the restricting projection, respectively. With this configuration, compared to a case where two restricting projections are formed separately on the inner face of one first side plate, a structure of a mold for forming the first link members can be simplified.

In the first aspect of the present invention, a configuration is also possible where the displacement restricting portion is formed by a fitting groove formed by recessing an outer edge portion of the first side plate, and displacement of the second coupling plates toward the inner face is restricted by fitting the outer edge portions of the second coupling plates into the fitting groove.

In the first aspect of the present invention, a configuration is also possible where a rear end portion of the fitting groove serves as an inversion restricting portion that abuts against the outer edge portion of the second coupling plates so as to restrict inversion of the second link member toward an outer face of the first side plate with respect to the first link member. With this configuration, the fitting groove has a function of restricting inversion of the second coupling plates toward the outer face of the first side plate, as well as a function of restricting displacement of the second coupling plates toward the inner face, and thus the shape of the first side plate can be simplified.

In the first aspect of the present invention, a configuration is also possible where the first coupling plates are placed on the outer face of the second coupling plates, and a reinforcing rib protruding from a region reaching from the second side plate to each of the second coupling plates is provided to each of the second coupling plates. With this configuration, the reinforcing ribs can restrict displacement of the second coupling plates toward the inner face.

In the first aspect of the present invention, a configuration is also possible where the first coupling plates are each shaped as an approximately flat plate without a level difference with respect to the axial direction of the wire harness, and the second coupling plates each have a level difference with respect to the axial direction of the wire harness. With this configuration, the second coupling plates have a level difference, and thus the harness guide can be formed into a gently sloped shape as a whole, viewed from the side. Furthermore, since the first coupling plates have a shape with no level difference, the same member can be used in the first link members of the harness guide disposed on the vehicle left side and in the first link members of the harness guide disposed on the vehicle right side.

In the first aspect of the present invention, a configuration is also possible where a protection plate is provided for covering at least one side face opening portion, out of a first side face opening portion located on the opposite side of the first side plate of the first link member, and a second side face opening portion located on the opposite side of the second side plate of the second link member. With this configuration, it is possible to prevent a foreign object from entering into the housing space.

In the first aspect of the present invention, a configuration is also possible where the first link members and the second link members are made of different kinds of synthetic resin materials. With this configuration, since the first link members and the second link members are made of different kinds of synthetic resin materials, even when the first link members and the second link members come in sliding contact with each other when being relatively displaced, friction due to intermolecular forces is small, and thus the noise generated at the time of the sliding contact can be suppressed.

Embodiment of Second Aspect of Invention

In the second aspect of the present invention, a configuration is also possible in which the first link members each include the first side plate that faces one side face of the wire harness and a pair of upper and lower first coupling plates that extend from the first side plate and that face the upper and lower faces of the wire harness, and the second link members each include the second side plate that faces another side face of the wire harness and a pair of upper and lower second coupling plates that extend from the second side plate and that face the upper and lower faces of the wire harness, and the housing space is formed by the first coupling plates and the second coupling plates being coupled so as to be capable of being relatively displaced around vertical shafts.

According to this configuration, when the harness guide is attached to the wire harness, only either of the first link members and the second link members are placed in a jig or the like, and fit the wire harness to the set link members in the direction intersecting the axis of the wire harness. Thereafter, the other link members may be coupled to the set link members. When fitting the wire harness into the link members, there is no risk that the end portion of the wire harness will interfere with the inner face of the housing space, and thus the size of link members can be set to a size corresponding to an outer diameter of the wire harness. Accordingly, it is possible to make the housing space narrower and achieve reduction of space taken up by the harness guide.

In the second aspect of the present invention, a configuration is also possible where the first coupling plates are placed on the outer faces of the second coupling plates, and the first side plate is provided with a displacement restricting portion that abuts against the second coupling plates so as to restrict displacement of the second coupling plates toward the inner face. With this configuration, even if a pressing force acting in the vertical direction is applied on the outer face of the harness guide, the displacement restricting portion restricts displacement of the second coupling plates toward the inner face, and thus displacement of the first coupling plates, which are placed on the outer faces of the second coupling plates, toward the inner face, is also restricted. In this manner, deformation of the harness guide by being crushed in the vertical direction can be prevented.

In the second aspect of the present invention, a configuration is also possible where the displacement restricting portion is formed by a restricting projection protruding from the inner face of the first side plate, and displacement of the second coupling plates toward the inner face is restricted by outer edge portions of the second coupling plates being engaged with the restricting projection.

In the second aspect of the present invention, a configuration is also possible where the restricting projection is shaped like a rib and extends along an axial direction of the wire harness, and the two second coupling plates can abut against the two end portions of the restricting projection, respectively. With this configuration, compared to a case where two restricting projections are formed separately on the inner face of one first side plate, a structure of a mold for forming the first link members can be simplified.

In the second aspect of the present invention, a configuration is also possible where the displacement restricting portion is constituted by a fitting groove formed by recessing an outer edge portion of the first side plate, and displacement of the second coupling plates toward the inner side is restricted by fitting the outer edge portions of the second coupling plates into the fitting groove.

In the second aspect of the present invention, a configuration is also possible where a rear end portion of the fitting groove serves as an inversion restricting portion that abuts against the outer edge portion of the second coupling plates so as to restrict inversion of the second link member toward an outer face of the first side plate with respect to the first link member. With this configuration, the fitting groove has a function of restricting inversion of the second coupling plates toward the outer face of the first side plate, as well as a function of restricting displacement of the second coupling plates toward the inner face, and thus the shape of the first side plate can be simplified.

In the second aspect of the present invention, a configuration is also possible where the first coupling plates are placed on the outer face of the second coupling plates, and a reinforcing rib protruding from a region reaching from the second side plate to each of the second coupling plates is provided to each of the second coupling plates. With this configuration, the reinforcing ribs can restrict displacement of the second coupling plates toward the inner face.

In the second aspect of the present invention, a configuration is also possible where the first coupling plates are each shaped as an approximately flat plate without a level difference with respect to the axial direction of the wire harness, and the second coupling plates each have a level difference with respect to the axial direction of the wire harness. With this configuration, the second coupling plates each have a level difference, and thus the harness guide can be formed into a gently sloped shape as a whole, viewed from the side.

Furthermore, since the first coupling plates each have a shape with no level difference, the same member can be used in both the first link members of the harness guide disposed on the vehicle left side and the first link members of the harness guide disposed on the vehicle right side.

In the second aspect of the present invention, a configuration is also possible where a protection plate for covering at least one side face opening portion, out of a first side face opening portion located on the opposite side of the first side plate of the first link member, and a second side face opening portion located on the opposite side of the second side plate of the second link member. With this configuration, it is possible to prevent a foreign object from entering into the housing space.

First Embodiment

Figure 2:
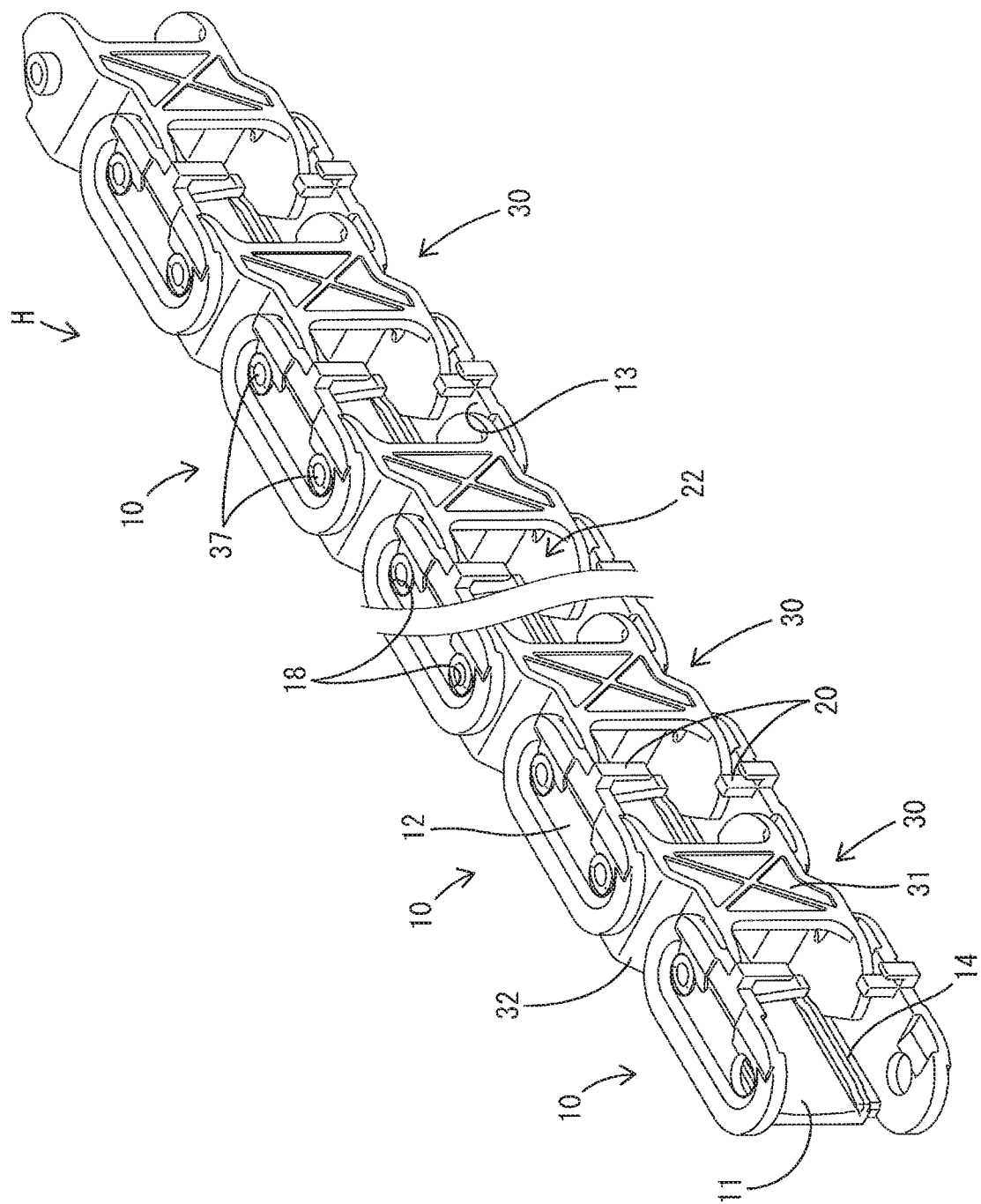
FIG. 2 is a perspective view of the harness guide viewed from a second side plate side.
Figure 3:
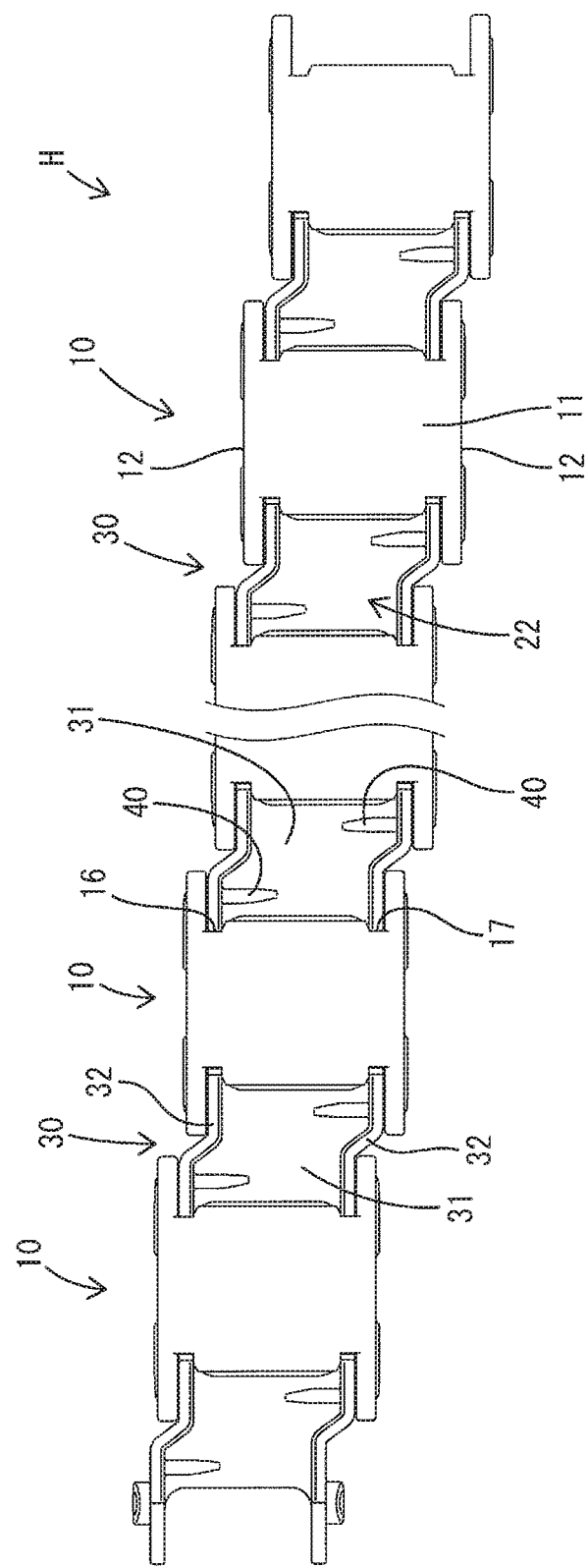
FIG. 3 is a side view of the harness guide viewed from the first side plate side.
Figure 4:
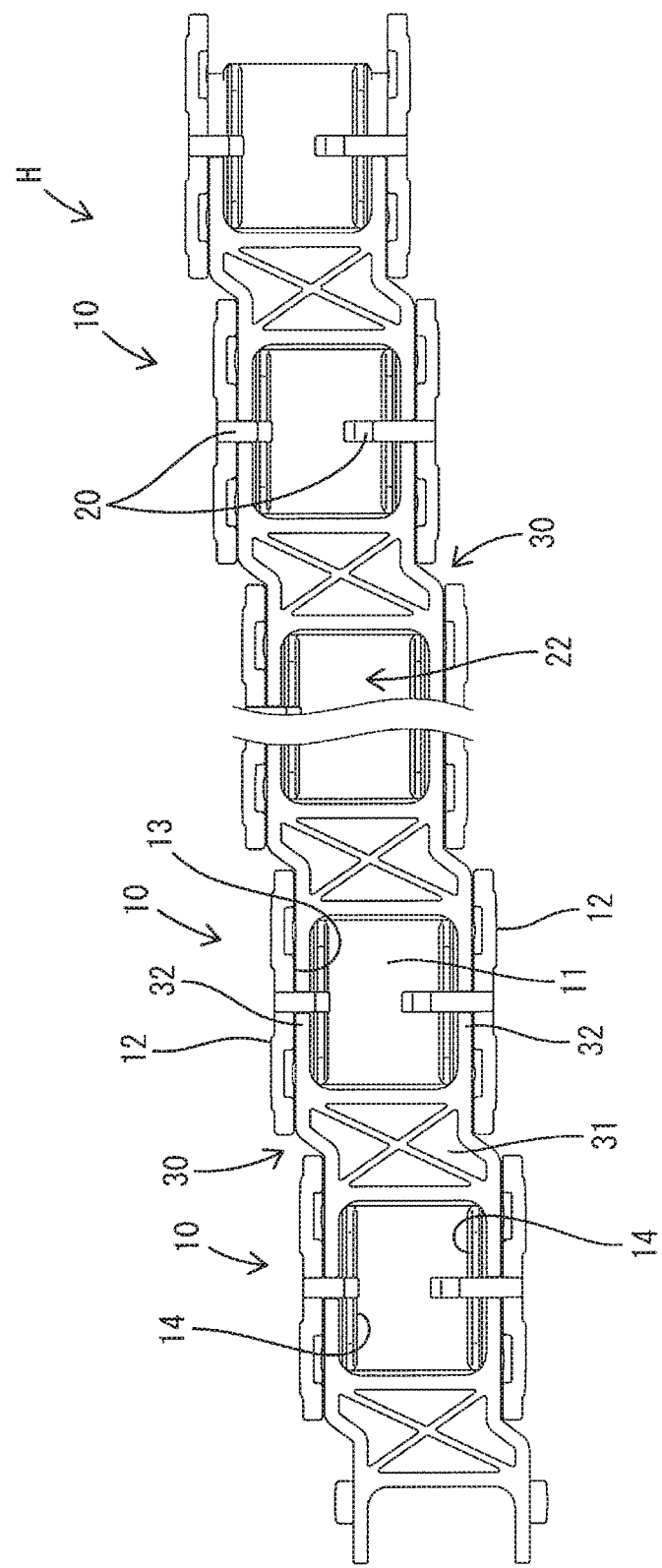
FIG. 4 is a side view of the harness guide viewed from the second side plate side.
Figure 5:
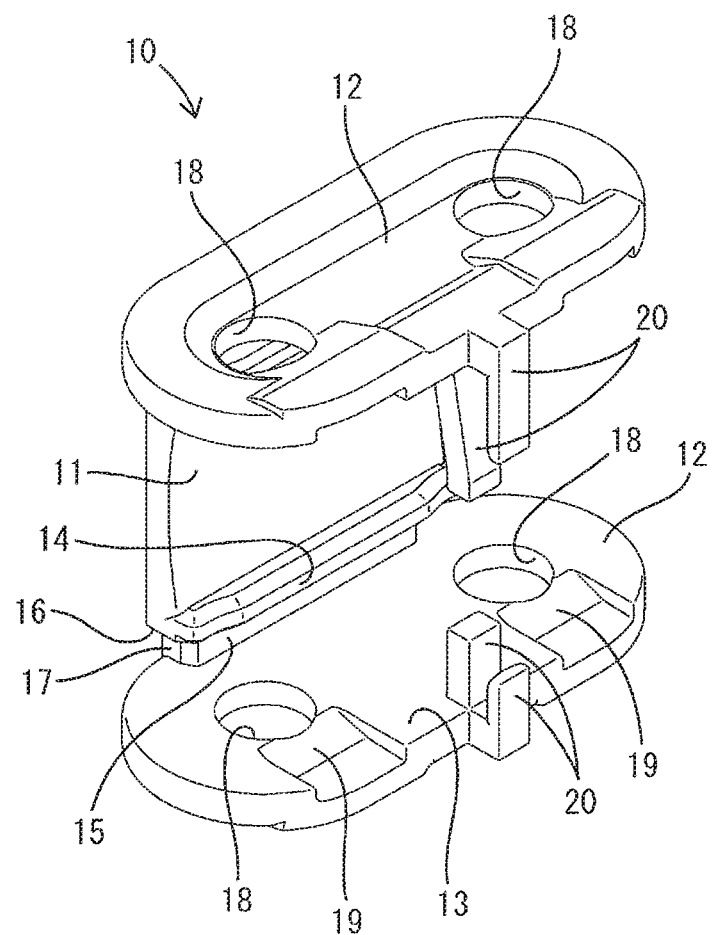
FIG. 5 is a perspective view of a first link member.
Figure 6:
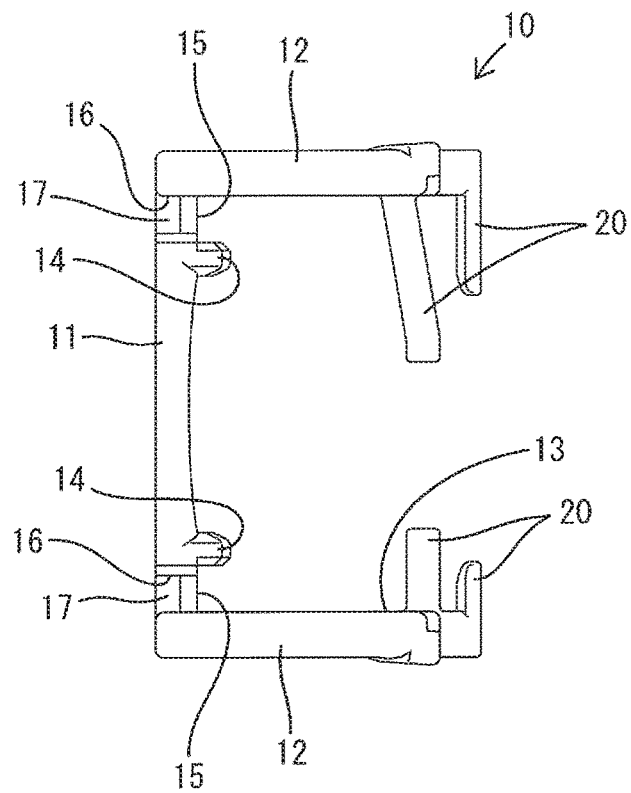
FIG. 6 is a front view of the first link member.
Figure 7:
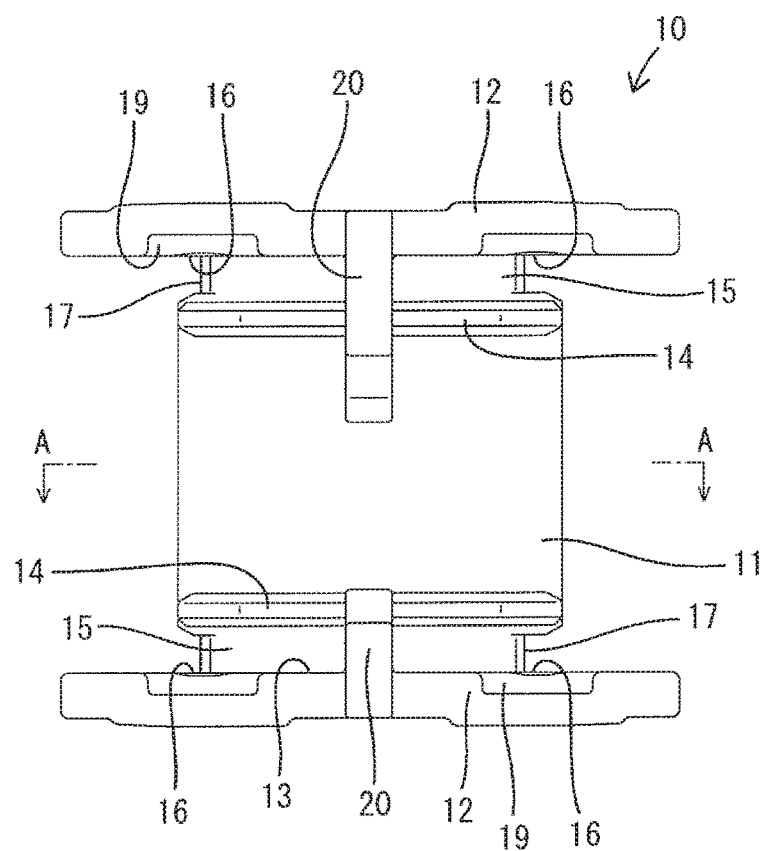
FIG. 7 is a side view of the first link member.
Figure 8:
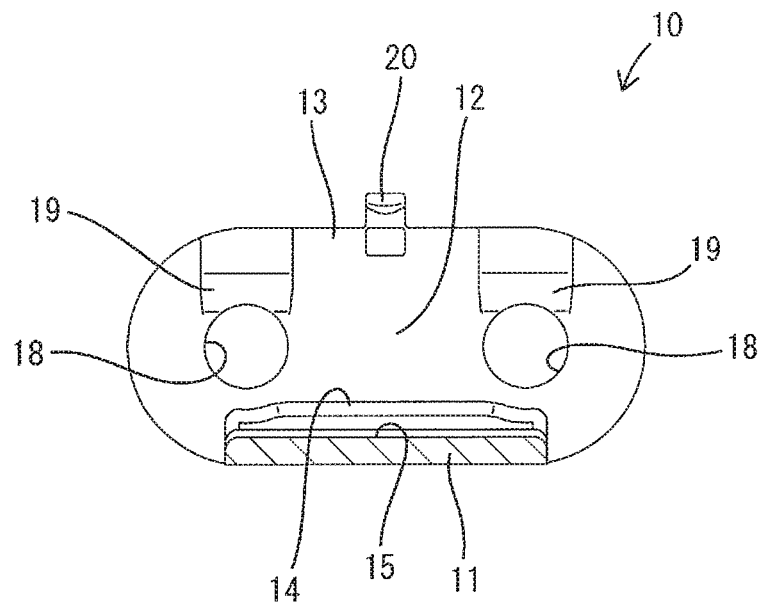
FIG. 8 is a cross-sectional view taken along line A-A of FIG. 7.
Figure 9:
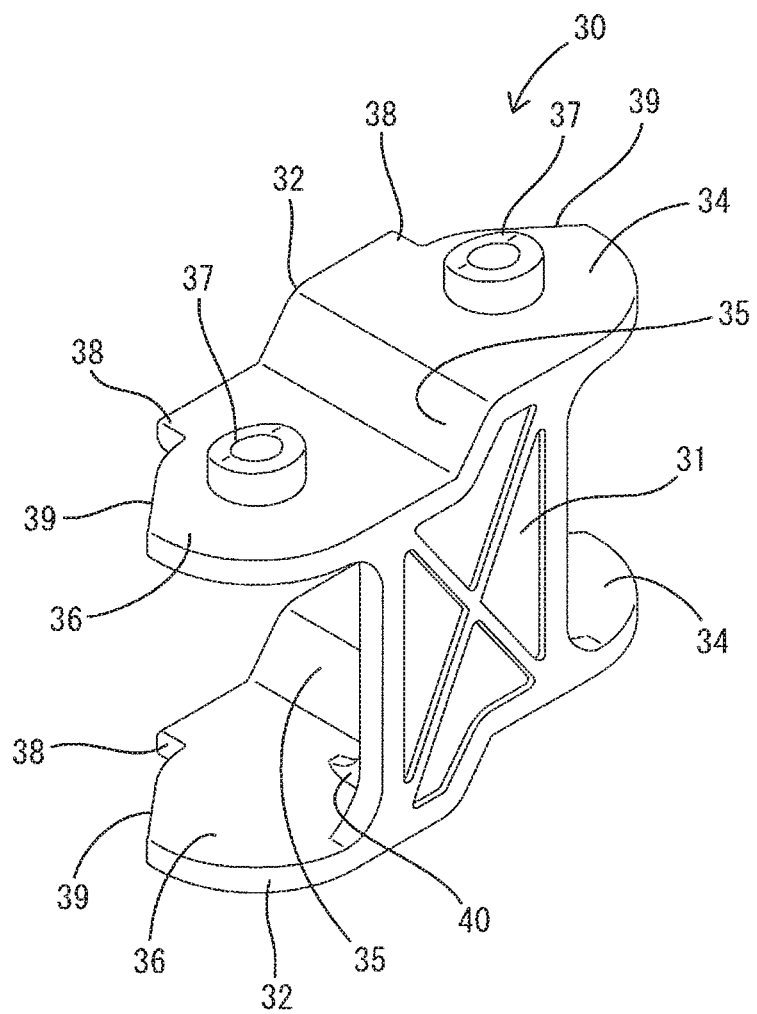
FIG. 9 is a perspective view of a second link member.
Figure 10:
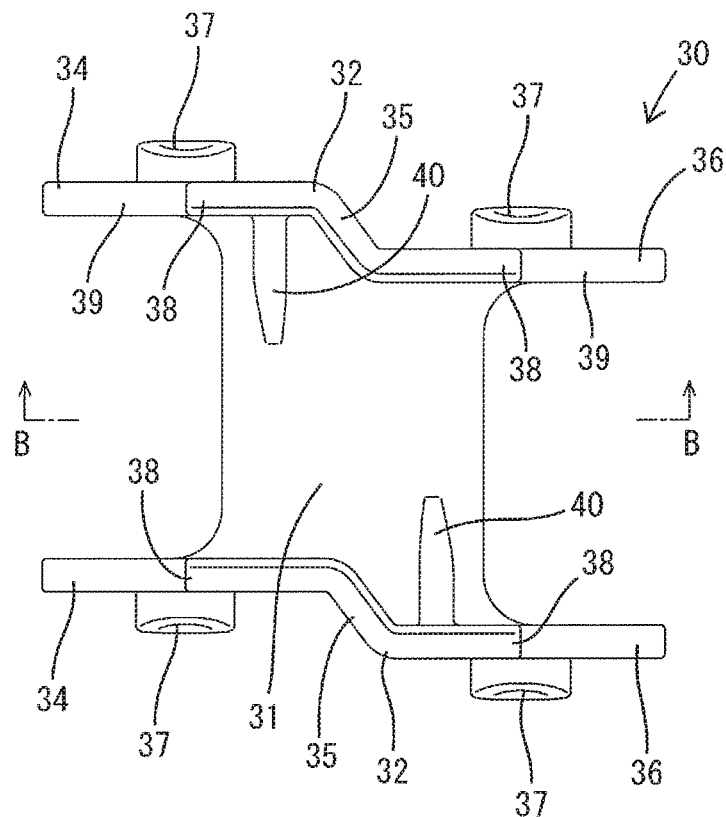
FIG. 10 is a side view of the second link member.
Figure 11:
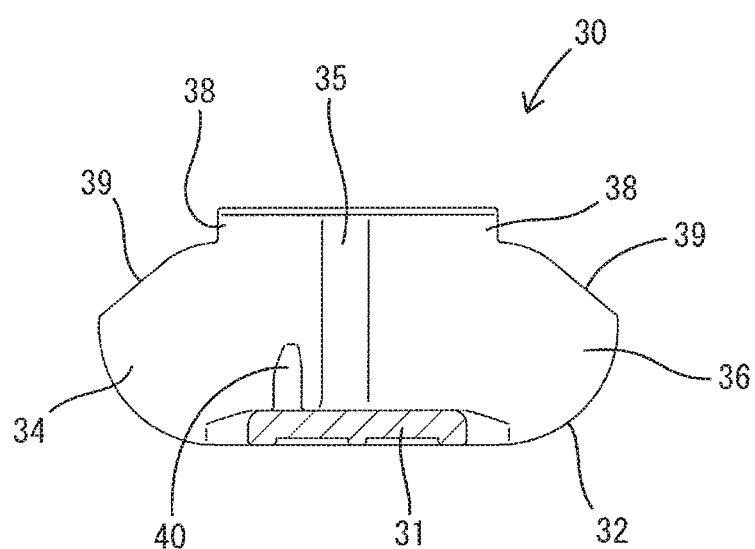
FIG. 11 is a cross-sectional view taken along line B-B of FIG. 10.
Figure 12:
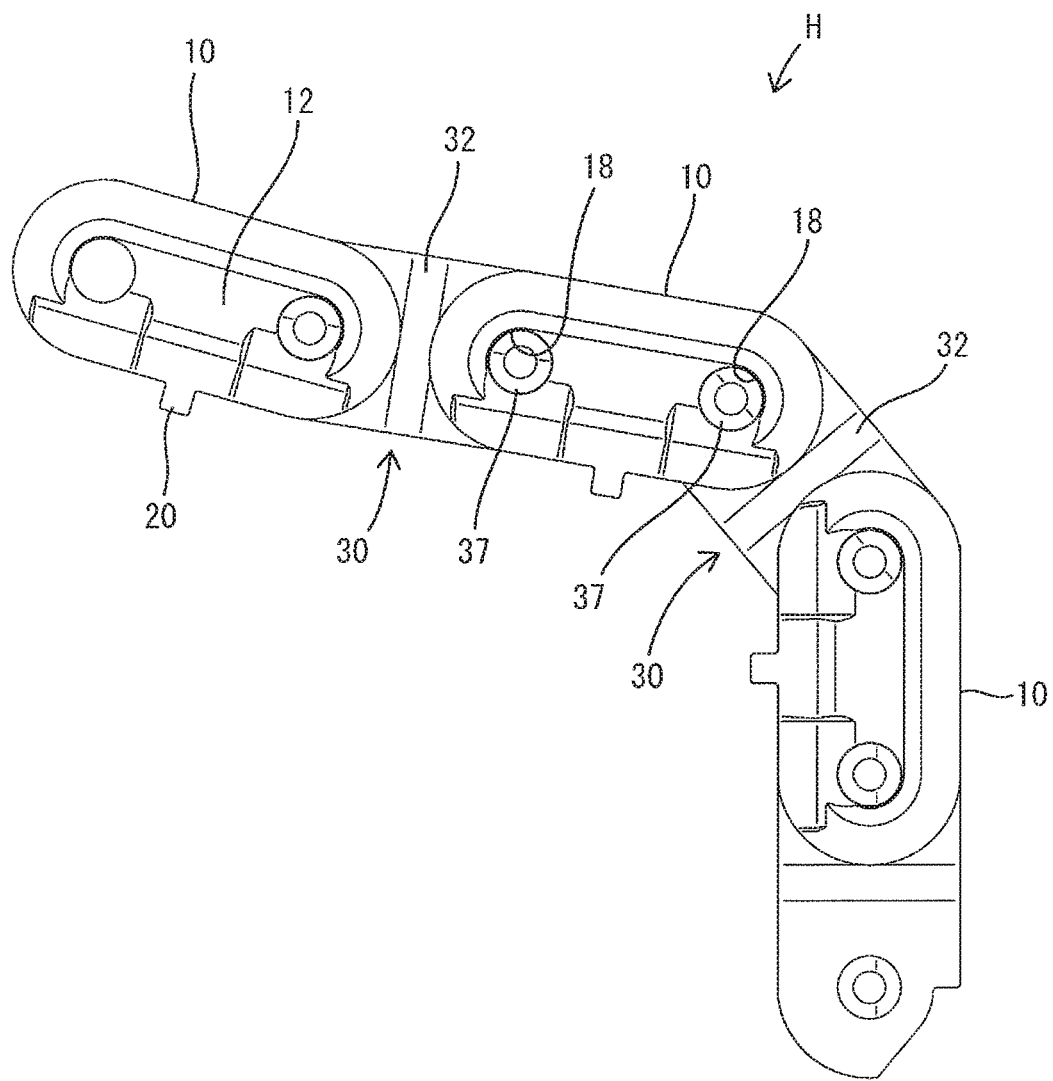
FIG. 12 is a top view showing how the harness guide is bent.
Figure 13:
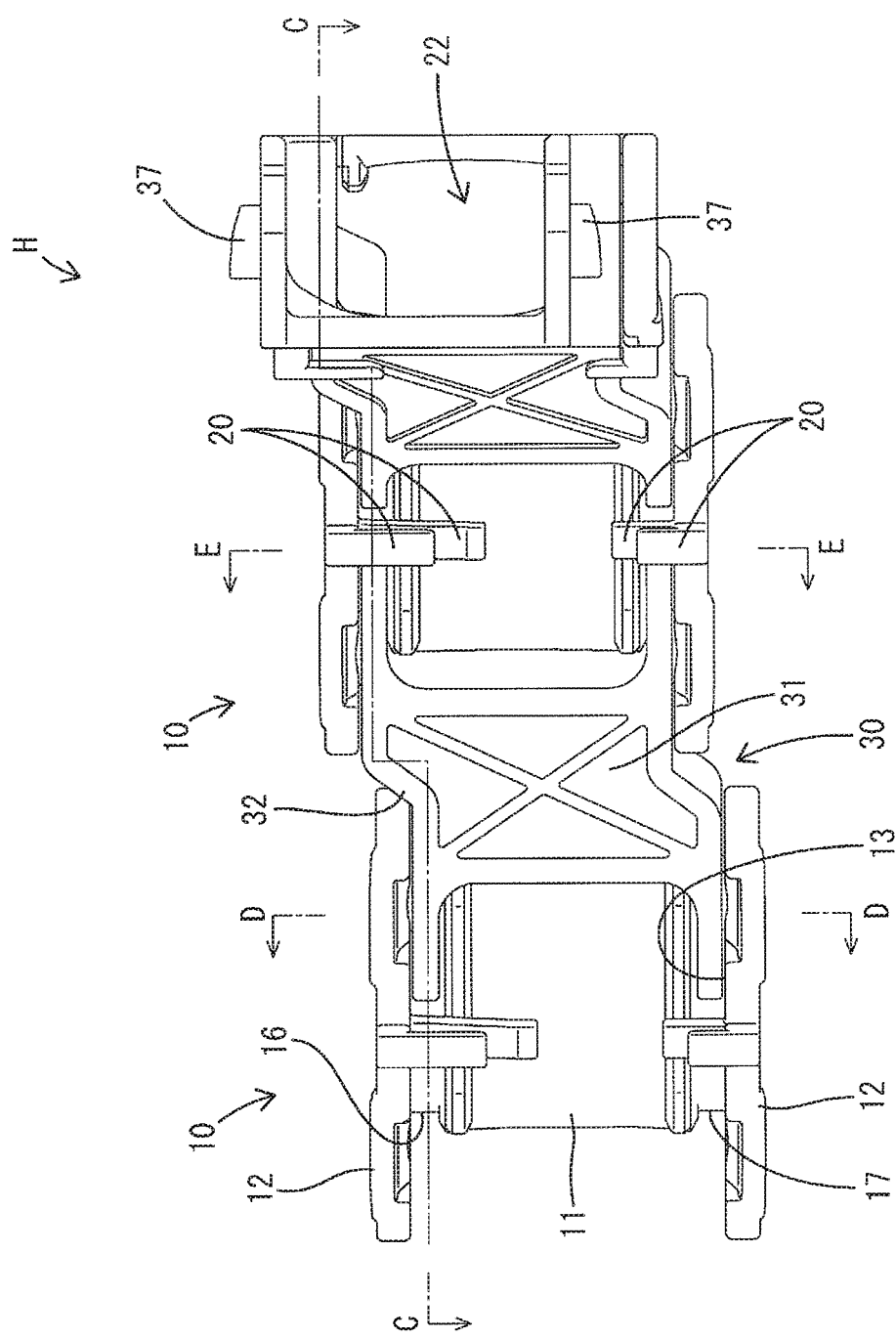
FIG. 13 is a side view showing how the harness guide is bent.
Figure 14:
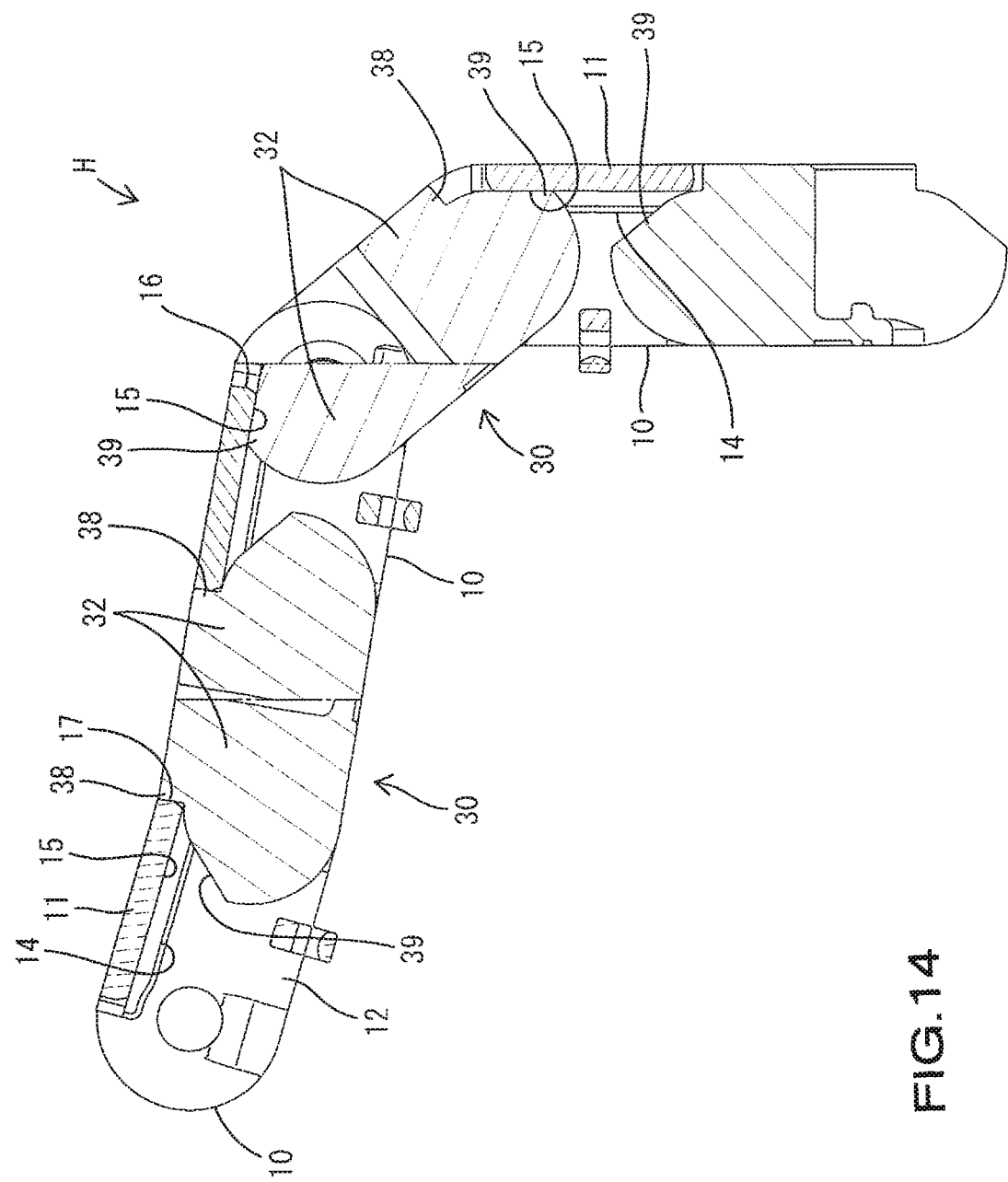
FIG. 14 is a cross-sectional view taken along line C-C of FIG. 13.
Figure 15:
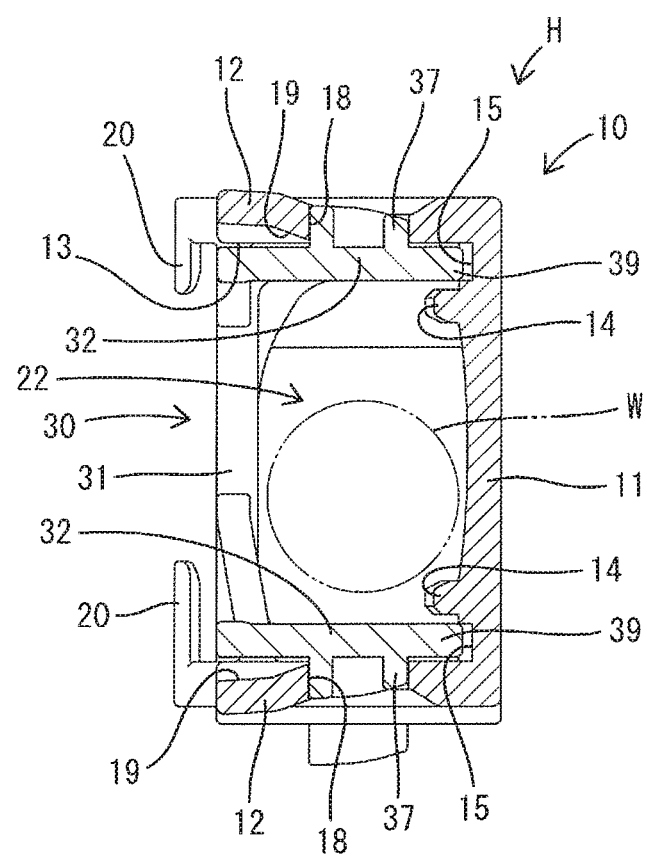
FIG. 15 is a cross-sectional view taken along line D-D of FIG. 13.
Figure 16:
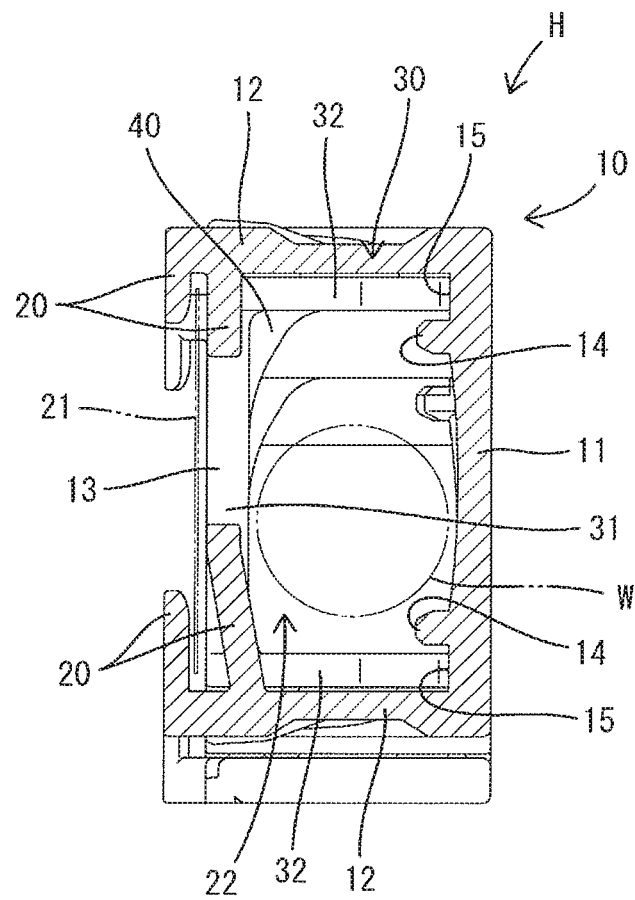
FIG. 16 is a cross-sectional view taken along line E-E of FIG. 13.
Figure 17:
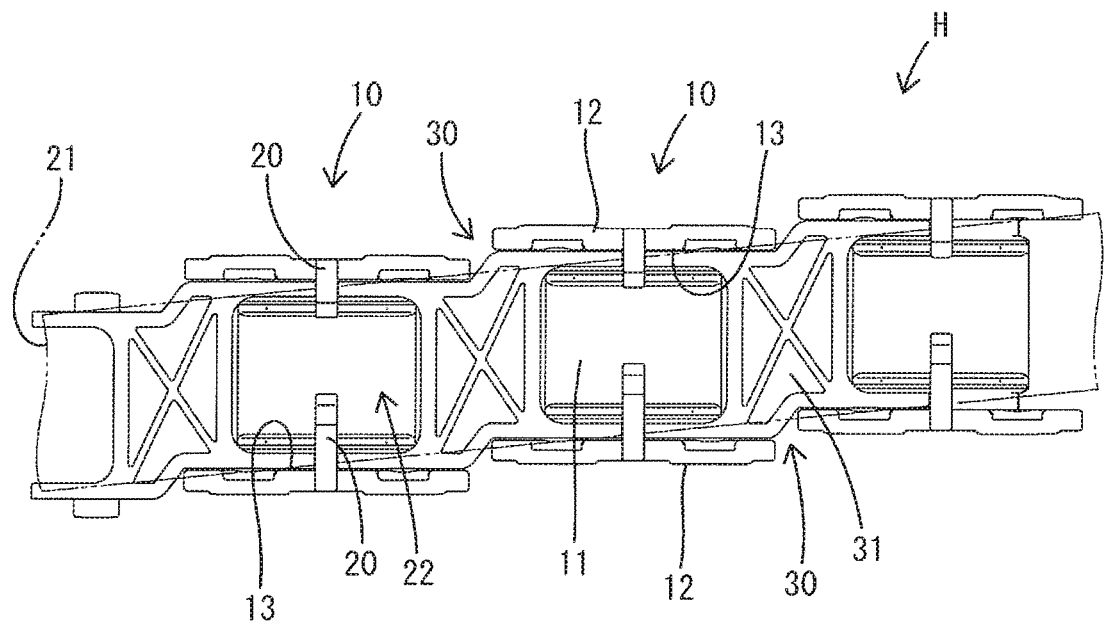
FIG. 17 is a side view showing how a protection plate is attached.

Hereinafter, a first embodiment in which an aspect of the present invention is embodied will be described with reference to FIGS. 1 to 17. In the following description, the up-down (vertical) directions shown in FIGS. 1 to 7, 9, 10, 13, and 15 to 17 are defined as "upper direction" and "lower direction".

A harness guide H of the first embodiment is a means for guiding a wire harness W routed between a vehicle body (not shown) and a slide door (not shown) so as to bend a predetermined portion of the wire harness W on a horizontal plane in a predetermined curvature, when the slide door is opened and closed, while protecting the wire harness W from colliding with foreign objects. The harness guide H is elongated as a whole, and the inside of the harness guide H is an elongated housing space 22 for housing the wire harness W.

The harness guide H is formed by a plurality of first link members 10 and a plurality of second link members 30 being alternately arranged along an axial direction of the wire harness W, and coupled in a row so as to be capable of rotating relatively to each other and being displaced within an approximately horizontal plane using vertical shafts as the supporting points. The first link members 10 are single components formed from a synthetic resin material such as a polyamide (PA). The second link members 30 are single components formed by a synthetic resin material such as polypropylene (PP), that is, a synthetic resin material other than that used in the first link members 10.

First Link Member 10

The first link members 10 each include a first side plate 11 opposed to one outer lateral face of the wire harness W with the surface of the first side plate 11 being oriented in the vertical direction, and a pair of upper and lower first coupling plates 12 approximately horizontally extending from an upper end edge and lower end edge of the first side plate 11 in a cantilever manner, respectively, so as to be opposed to upper and lower faces of the wire harness W. The dimension of the first coupling plate 12 in the axial direction of the wire harness W is larger than that of the first side plate 11, and the two end portions of the first coupling plate 12 protrude outward beyond the first side plate 11.

The first link members 10 approximately have a "[" shape when viewed in parallel with the axis of the wire harness W. The inner spaces of the first link member 10 (spaces defined by the first side plate 11 and the pair of the first coupling plates 12) form the housing space 22. In the first link member 10, a first side face opening portion 13 which is an opening of the housing space 22 toward the exterior of the harness guide H is provided on the opposite side of the first side plate 11 with respect to the wire harness W.

The first side plate 11 has an approximately rectangular shape in a side view. The inner face of the first side plate 11 is provided with a pair of upper and lower restricting projections 14 (referred to as "displacement restricting portion" in the claims), that are horizontally projecting, in a rib-like manner, from a position slightly below the upper end edge of the first side plate 11 and a position slightly above the lower end edge of the first side plate 11, respectively. The upper end portion of the inner face of the first side plate 11 (a horizontally-extending elongated region that is adjacent to and above the upper restricting projection 14) and the lower end portion of the inner face of the first side plate 11 (a horizontally-extending elongated region that is adjacent to and below the lower restricting projection 14) are angle restricting faces 15.

The first side plate 11 includes a pair of side edge portions extending in the vertical direction. The side edge portions each include a pair of upper and lower fitting grooves 16 (referred to as "displacement restricting portion" in the claims). The upper fitting groove 16 is formed by recessing the upper end portion of the side edge portion, and the lower fitting groove 16 is formed by recessing the lower end portion of the side edge portion. The rear end portions of the fitting grooves 16 are inversion restricting portions 17.

The first coupling plates 12 have an approximately oval shape in a top view. The first coupling plates 12 have an approximately planar shape without a level difference. A pair of coupling holes 18 spaced apart in the axial direction of the wire harness W penetrate each of the first coupling plates 12. The direction in which the coupling holes 18 penetrate the first coupling plates 12 is the vertical direction. Furthermore, a pair of guide grooves 19 spaced apart in the axial direction of the wire harness W are formed in the inner face (a face opposed to the wire harness W in the housing space 22) of the first coupling plates 12. The guide grooves 19 are oblique with respect to the inner face of each first coupling plates 12 and reach from the outer edge portions of the first coupling plates 12 to the coupling holes 18. The guide grooves 19 have a function of guiding coupling shafts 37 of the second coupling plates 32 to the coupling holes 18.

The upper first coupling plate 12 includes a bifurcated holding projection 20 extending downward in a cantilever manner, and the lower first coupling plate 12 includes a bifurcated holding projection 20 extending upward in a cantilever manner. The pair of upper and lower holding projections 20 extend from the outer edge of the first coupling plate 12 that is an outer edge portion on the opposite side of the linear outer edge portion that is contiguous with the first side plate 11. A strip-shaped protection plate 21 formed of a flexible or elastic synthetic resin or the like is attached to the upper holding projection 20 and the lower holding projection 20. The protection plate 21 attached to the holding projections 20 covers the first side face opening portion 13.

Second Link Member 30

The second link members 30 each include a second side plate 31 that faces another outer face of the wire harness W with the surface of the second side plate 31 being oriented in the vertical direction, and a pair of upper and lower second coupling plates 32 that extend approximately horizontally from the upper end edge and lower end edge of the second side plate 31 in a cantilever manner, respectively, facing the upper and lower faces of the wire harness W. The second side plate 31 is parallel to the first side plate 11, and is arranged so that the wire harness W is interposed between the second side plate 31 and the first side plate 11. A dimension of second coupling plates 32 in the axial direction of the wire harness W is larger than that of the second side plate 31, and the two end portions of the second coupling plates 32 extend outward beyond the second side plate 31.

The second link members 30 approximately have a "[" shape in mirror-symmetry with respect to the first link members 10 as viewed in parallel with the axis of the wire harness W. The inner spaces of the second link members 30 (spaces defined by the second side plate 31 and the pair of the second coupling plates 32) form the housing space 22. In the second link members 30, a second side face opening portion 33 which is the opening of the housing space 22 toward the exterior of the harness guide H is provided on the opposite side of the second side plate 31 with respect to the wire harness W.

The upper and lower second coupling plates 32 are not rectangular in a side view, but the upper and lower edge portions are bent into a stepped shape. Accordingly, the second coupling plates 32 each have a shape which is not planar but has a stepped shape with a level difference in a side view. In other words, the second coupling plates 32 are each formed by arranging a higher wall part 34, a stepped part 35, and a lower wall part 36 in this order in the axial direction of the wire harness W. The higher wall part 34 and the lower wall part 36 are approximately horizontal flat plates, whereas the higher wall part 34 is arranged at a higher position than the lower wall part 36. The vertical interval between the higher wall part 34 at the top and the higher wall part 34 at the bottom is substantially the same as the vertical interval between the lower wall part 36 at the top and the lower wall part 36 at the bottom.

A pair of coupling shafts 37 are provided on the upper face (outer face) of the higher wall part 34 at the top and the upper face (outer face) of the lower wall part 36 at the top with an interval in the axial direction of the wire harness W. A pair of coupling shafts 37 are also provided on the lower face (outer face) of the higher wall part 34 at the bottom and the lower face (outer face) of the lower wall part 36 at the bottom with an interval in the axial direction of the wire harness W. The axial direction of these coupling shafts 37 is vertical, and the first link members 10 and the second link members 30 are coupled with each other by fitting the coupling shafts 37 into the coupling holes 18 of the first coupling plates 12.

Fitting projections 38 are formed in the region of the outer edge portion of the higher wall parts 34 and the region of the outer edge portion of the lower wall parts 36 that face the second side face opening portions 33. The fitting projections 38 are arranged at the approximately same positions as the coupling shafts 37 with respect to the axial direction of the wire harness W. The fitting projections 38 can be fitted into the fitting grooves 16 in the first side plate 11. The fitting projections 38 that have been fitted into the fitting grooves 16 can engage with the fitting grooves 16 in the vertical direction and abut against the inversion restricting portions 17 in the horizontal direction.

Restricting edge portions 39 are formed in the region of the outer edge portion of the higher wall parts 34 and the region of the outer edge portion of the lower wall parts 36 that face the second side face opening portion 33. The restricting edge portions 39 can engage with the restricting projections 14 of the first side plate 11 in the vertical direction, and abut against the angle restricting faces 15 in the horizontal direction. The restricting edge portions 39 are disposed in regions that are further distanced from the stepped parts 35 than the coupling shafts 37 in the axial direction of the wire harness W.

A pair of reinforcing ribs 40 spaced apart in the axial direction of the wire harness W are formed on the second link member 30. One reinforcing rib 40 protrudes continuously over a region reaching from the inner face of the higher wall part 34 at the top to the inner face of the first side plate 11, and restricts or suppresses displacement of the higher wall part 34 at the top in the vertical direction. The other reinforcing rib 40 protrudes continuously over a region reaching from the inner face of the lower wall part 36 at the bottom to the inner face of the first side plate 11, and restricts or suppresses displacement of the lower wall part 36 at the bottom in the vertical direction.

Operations and Effects of Embodiments

When the harness guide H is attached to the wire harness W, first, a plurality of first link members 10 are placed in a jig (not shown) with the openings of the first side face opening portions 13 facing upward. At this time, the plurality of first link members 10 are positioned at the same pitch as when coupled to the second link members 30. In this state, the wire harness W is attached to the first link members 10.

At this time, the wire harness W is not inserted into the inner spaces of the first link members 10 along their axes, but is housed in the inner spaces from the first side face opening portions 13 while being moved in the direction (downward) that intersects its axes. The holding projections 20 project toward the first side face opening portions 13, the first side face opening portions 13 open upward, and thus an operator can easily confirm the position of the holding projections 20. Accordingly, it is not difficult to perform the work for pressing the wire harness W into the spaces between the upper and lower holding projections 20. In this manner, the wire harness W can be readily housed in the inner spaces of the plurality of the first link members 10.

After the wire harness W is attached to the first link members 10 as described above, the plurality of second link members 30 are attached to the plurality of first link members 10. At this time, the second link members 30, with the outer faces of second side plates 31 facing upward, are each positioned so as to bridge two adjacent first link members 10. Then, the coupling shafts 37 are fitted into the guide grooves 19, and the pair of second coupling plates 32 are placed on the inner faces of the pair of first coupling plates 12 and housed in the inner spaces of the first link members 10.

When all the coupling shafts 37 are fitted into the coupling holes 18 through the guide grooves 19, the assembly of the plurality of first link members 10 and the plurality of second link members 30 is complete, and the wire harness W is housed in the housing space 22 of the harness guide H. In this manner, the attachment of the housing guide to the wire harness W is complete. Thereafter, the harness guide H is removed from the jig, and the upper and lower edge portions of the protection plates 21 are slid and engaged with the holding projections 20. Accordingly, the first side face opening portions 13 are covered with the protection plates 21, and foreign objects are prevented from entering into the housing space 22. As described above, the assembly of the harness guide H and the attachment of the wire harness W to the harness guide H are complete.

When the harness guide H is viewed in parallel with the axis of the wire harness W, the first side plates 11 and the second side plates 31 are located on opposite sides of the wire harness W in the horizontal direction. In a top view, the plurality of first side plates 11 and the plurality of second side plates 31 are arranged in a zig-zag manner with the wire harness W interposed therebetween. Also, in a top view, the plurality of first side face opening portions 13 and the plurality of second side face opening portions 33 are arranged in a zig-zag manner with the wire harness W interposed therebetween. In a side view along a plane intersecting the axis of the wire harness W, the plurality of the first side plates 11 and the plurality of the second side face opening portions 33 are alternately arranged in a row, whereas the plurality of second side plates 31 and the plurality of the first side face opening portions 13 are alternately arranged in a row.

The harness guide H of the present embodiment can achieve space reduction and suppress noise. The harness guide H is formed by coupling the plurality of first link members 10 and the plurality of the second link members 30 alternately along the axial direction of the wire harness W, and the elongated housing space 22 for housing the wire harness W is formed inside the harness guide H.

The first link members 10 each include the first side plate 11 that faces one side of the wire harness W and the pair of upper and lower first coupling plates 12 that extend from the first side plate 11 and that faces the upper and lower faces of the wire harness W The second link members 30 each include the second side plate 31 that faces the other side of the wire harness W and the pair of upper and lower second coupling plates 32 that extend from the second side plate 31 and that faces the upper and lower faces of the wire harness W. The first coupling plates 12 and the second coupling plates 32 are coupled with each other so as to be capable of relatively rotating about the vertical shafts using the coupling holes 18 and the coupling shafts 37.

According to the harness guide H of the present embodiment, when attaching the harness guide H to the wire harness W, only the first link members 10 are placed in the jig (not shown) and fit the wire harness W into the plurality of first link members 10 that have been placed, in the direction intersecting the axial direction of wire harness W. Thereafter, the second link members 30 are coupled with the first link members 10. When fitting the wire harness W into the first link members 10, there is no risk that the edge portion of the wire harness W will interfere with the inner face of the housing space 22, and thus the size of the first link members 10 can be set to the dimension corresponding to the outer diameter of the wire harness W. Accordingly, it is possible to make the housing space 22 narrower and achieve reduction of space taken up by the harness guide H.

Furthermore, the first coupling plates 12 are placed on the outer faces of the second coupling plates, and the first side plate 11 includes the displacement restricting portions (the restricting projections 14 and the fitting grooves 16) for abutting against the second coupling plates 32 to restrict displacement of the second coupling plates 32 toward the inner face. With this configuration, even when a pressing force acting in the vertical direction is applied on the outer face of the harness guide H, the displacement restricting portions restrict displacement of the second coupling plates 32 toward the inner face (housing space 22), and thus the first coupling plates 12, which are placed on the outer faces of the second coupling plates 32 are also restricted from being displaced toward the inner face. In this manner, it is possible to prevent deformation of the harness guide H by being crushed in the vertical direction.

Furthermore, the restricting projections 14 that protrude from the inner face of the first side plate 11 are formed as the displacement restricting portion. The restricting edge portions 39 of the outer edge portions of the second coupling plates 32 are engaged with the restricting projections 14 upward or downward, and thus displacement of the second coupling plates 32 toward the inner face can be restricted. Also, the restricting projections 14 are each shaped like a rib and extend along the axial direction of the wire harness W, and the restricting edge portions 39 of the two second coupling plates 32 can abut against the two end portions of the restricting projections 14, respectively. Since the two restricting edge portions 39 abut against one restricting projection 14 extending in a rib-like manner, compared to the case where the two restricting projections 14 are separately formed on the inner face of one first side plate 11, it is possible to simplify the structure of the mold for forming the first link members 10.

Furthermore, in addition to the restricting projections 14, the fitting grooves 16, in which the outer edge portions of the first side plate 11 are recessed, are formed as another displacement restricting portion. Displacement of the second coupling plates 32 toward the inner face is restricted by the restricting edge portions 39 of the outer edge portions of the second coupling plates 32 being fitted into the fitting grooves 16. The rear end portions of the fitting grooves 16 are the inversion restricting portions 17. The fitting projections 38 of the outer edge portions of the second coupling plates 32 abut against the inversion restricting portions 17, and thus it is possible to restrict inversion of the second link member 30 toward the outer face of the first side plate 11 with respect to the first link member 10. The fitting grooves 16 have a function of restricting inversion of the second coupling plates 32 toward the outer face of the first side plate 11 as well as a function of restricting displacement of the second coupling plates 32 toward the inner face (housing space 22). Accordingly, compared to the case where these two functions are realized by individual parts, the shape of the first side plate 11 can be simplified.

Furthermore, the first coupling plates 12 are placed on the outer faces of the second coupling plates, and the reinforcing ribs 40 extending from the region reaching from the second side plate 31 to each of the second coupling plates 32 are provided to each of the second coupling plates 32. The second coupling plates 32 and the first coupling plates 12 are restricted or suppressed from being displaced toward the inner face (housing space 22) by not only the restricting projections 14 and the fitting grooves 16 formed on the first link member 10, but also by the reinforcing ribs 40 formed on the second link member 30.

Furthermore, the first coupling plates 12 are each shaped as an approximately flat plate without a level difference with respect to the axial direction of the wire harness W. On the other hand, the second coupling plates 32 each have a level difference with respect to the axial direction of the wire harness W. Since the second coupling plates 32 of the second link member 30 have a level difference, the harness guide H can be shaped so as to gradually tilt as a whole in a side view by interposing the second link members 30 interposed between the adjacent first link members 10. Since the first coupling plates 12 have no level difference, the same member can be used in both the first link members 10 of the harness guide H disposed on the vehicle left side and the first link members 10 of the harness guide H disposed on the vehicle right side.

Additionally, the first side face opening portion 13 is not opposed to the slide door but faces the space between the vehicle body and the slide door when the slide door is open. As such, there is a concern that foreign objects (e.g., a ferrule of a tip end of an umbrella) will enter into the housing space 22 through the first side face opening portions 13. To address this, the protection plates 21 for covering the first side face opening portions 13 which are on the opposite side of the first side plates 11 in the first link members 10 are provided to the harness guide H. With this configuration, it is possible to prevent a foreign object from entering into the housing space 22 through the first side face opening portions 13.

The harness guide H of the present embodiment includes the plurality of first link members 10 that faces the outer face of the wire harness W and the plurality of second link members 30 that faces the outer face of the wire harness W, and is formed by the plurality of first link members 10 and the plurality of second link members being alternately arranged and coupled so as to be capable of being relatively displaced around the vertical shafts. When the first link members 10 and the second link members 30 are relatively displaced, there is a concern that noise will be generated by the inner face of the first coupling plates 12 and the outer face of the second coupling plates 32 coming in sliding contact with each other.

In view of this, the first link members 10 and the second link members 30 are made of different synthetic resin materials. Accordingly, since friction due to intermolecular forces between the first coupling plates 12 and the second coupling plates 32 is reduced, even when the first coupling plates 12 and second coupling plates 32 come in sliding contact with each other, the noise generated at the time of such sliding contact can be suppressed.

Other Embodiments

The present invention is not limited to the embodiment described above with reference to the drawings, and the following embodiments are also encompassed within the technical scope of the present invention, for example.

(1) Although the above embodiment describes that the restricting projections are formed on both upper end side and lower end side of the first coupling plate, it is also possible to form the restricting projection on either one of the upper end side and lower end side of the first coupling plate.

(2) Although the above embodiment describes that the restricting projection is shaped like a rib and extends along the axial direction of the wire harness, it is also possible to form the restricting projections on the separate portions distanced from each other in the axial direction of the wire harness.

(3) Although the above embodiment describes that the fitting grooves are formed on both upper end side and lower end side of the first coupling plate, it is also possible to form the fitting groove on either one of the upper end side and lower end side.

(4) Although the above embodiment describes that the rear end portions of the fitting grooves are the inversion restricting portions, it is also possible to form the inversion restricting portion on a portion other than the fitting grooves.

(5) Although the above embodiment describes that the restricting projection and the fitting groove serving as the displacement restricting portion are formed on the first coupling plate, it is also possible to form either one of the restricting projection and the fitting groove serving as the displacement restricting portion on the first coupling plate.

(6) Although the above embodiment describes that the reinforcing ribs are formed on the second coupling plates, a configuration is also possible in which the second coupling plates does not include the reinforcing ribs.

(7) Although the above embodiment describes that the coupling holes formed in the first coupling plate are fitted into the coupling shafts formed on the second coupling plate, it is also possible to fit the coupling shafts formed on the first coupling plate into the coupling holes formed in the second coupling plate. A configuration is also possible in which one coupling shaft and one coupling hole are formed in each of the first coupling plate and the second coupling plate, and the coupling shaft on the first coupling plate is fitted into the coupling hole on the second coupling plate and the coupling hole on the first coupling plate is fitted into the coupling shaft of the second coupling plate.

(8) Although the above embodiment describes that the first coupling plate has no level difference and the second coupling plate placed on the inner face of the first coupling plate has a level difference, a configuration is also possible in which both first coupling plate and second coupling plate have a level difference, and it is also possible that the first coupling plate has a level difference and the second coupling plate has no level difference.

(9) Although the above embodiment describes that the protection plate covers only the first side face opening portion of the first link member, a configuration is also possible in which the protection plate for covering the first side face opening portion of the first link member and a protection plate for covering the second side face opening portion of the second link member are provided, and another configuration is also possible in which the protection plate covers only the second side face opening portion of the second link member.

(10) Although the above embodiment describes that a protection plate for preventing a foreign object from entering into the housing space is provided, a configuration is also possible in which such protection plate is not provided.

(11) Although the above embodiment describes that the materials of the first link members and the second link members are different kinds of synthetic resins, the materials of the first link member and the second link member may also be the same kind of synthetic resin.

LIST OF REFERENCE NUMERALS

H Harness guide
W Wire harness
10 First link member
11 First side plate
12 First coupling plate
13 First side face opening portion
14 Restricting projection (displacement restricting portion)
16 Fitting groove (displacement restricting portion)
17 Inversion restricting portion
21 Protection plate
22 Housing space
30 Second link member
31 Second side plate
32 Second coupling plate
33 Second side face opening portion
40 Reinforcing rib

The invention claimed is:

1. A harness guide comprising:
a plurality of first link members each including a first side plate that is configured to face one side face of a wire harness and a pair of upper and lower first coupling plates that extend from the first side plate and that are configured to face upper and lower faces of the wire harness, and
a plurality of second link members each including a second side plate that is configured to face another side face of the wire harness and a pair of upper and lower second coupling plates that extend from the second side plate and that are configured to face the upper and lower faces of the wire harness,
wherein an elongated housing space for housing the wire harness is formed by alternately arranging the plurality of first link members and the plurality of second link members along an axial direction of the wire harness and coupling the first coupling plates and the second coupling plates so as to be relatively displaceable around vertical shafts,
the first coupling plates are placed on outer faces of the second coupling plates,
the first side plate is provided with a displacement restricting portion that abuts against the second coupling plates so as to restrict displacement of the second coupling plates toward an inner face of the second coupling plate,
the displacement restricting portion is formed by a restricting projection protruding from an inner face of the first side plate,
displacement of the second coupling plates toward the inner face of the second coupling plate is restricted by outer edge portions of the second coupling plates being engaged with the restricting projection,
the restricting projection is shaped like a rib and extends along the axial direction of the wire harness, and
the second coupling plates can abut against two end portions of the restricting projection, respectively.

2. The harness guide according to claim 1, wherein
the first coupling plates are each shaped as an approximately flat plate without a level difference with respect to the axial direction of the wire harness, and
the second coupling plates each have a level difference with respect to the axial direction of the wire harness.

3. The harness guide according to claim 1, wherein
a protection plate is provided for covering at least one side face opening portion, out of a first side face opening portion located on an opposite side of the first side plate of the first link member, and a second side face opening portion located on an opposite side of the second side plate of the second link members.

4. The harness guide according to claim 1, wherein
the first link members and the second link members are made of different kinds of synthetic resin materials.

5. A harness guide comprising:
a plurality of first link members each including a first side plate that is configured to face one side face of a wire harness and a pair of upper and lower first coupling plates that extend from the first side plate and that are configured to face upper and lower faces of the wire harness, and
a plurality of second link members each including a second side plate that is configured to face another side face of the wire harness and a pair of upper and lower second coupling plates that extend from the second side plate and that are configured to face the upper and lower faces of the wire harness,
wherein an elongated housing space for housing the wire harness is formed by alternately arranging the plurality of first link members and the plurality of second link members along an axial direction of the wire harness and coupling the first coupling plates and the second coupling plates so as to be relatively displaceable around vertical shafts,
the first coupling plates are placed on outer faces of the second coupling plates,
the first side plate is provided with a displacement restricting portion that abuts against the second coupling plates so as to restrict displacement of the second coupling plates toward an inner face, the displacement restricting portion is formed by a fitting groove formed by recessing an outer edge portion of the first side plate, and displacement of the second coupling plates toward the inner face is restricted by fitting outer edge portions of the second coupling plates into the fitting groove.

6. The harness guide according to claim 5, wherein a rear end portion of the fitting groove serves as an inversion restricting portion that abuts against the outer edge portions of the second coupling plates so as to restrict inversion of the second link members toward an outer face of the first side plate with respect to the first link members.

7. A harness guide comprising:

a plurality of first link members each including a first side plate that is configured to face one side face of a wire harness and a pair of upper and lower first coupling plates that extend from the first side plate and that are configured to face upper and lower faces of the wire harness, and a plurality of second link members each including a second side plate that is configured to face another side face of the wire harness and a pair of upper and lower second coupling plates that extend from the second side plate and that are configured to face the upper and lower faces of the wire harness, wherein an elongated housing space for housing the wire harness is formed by alternately arranging the plurality of first link members and the plurality of second link members along an axial direction of the wire harness and coupling the first coupling plates and the second coupling plates so as to be relatively displaceable around vertical shafts, the first coupling plates are placed on outer faces of the second coupling plates, and a reinforcing rib protruding from a region extending from the second side plate to each of the second coupling plates is provided to each of the second coupling plates.

8. The harness guide according to claim 7, wherein the first side plate is provided with a displacement restricting portion that abuts against the second coupling plates so as to restrict displacement of the second coupling plates toward an inner face of the second coupling plate.

9. The harness guide according to claim 8, wherein the displacement restricting portion is formed by a restricting projection protruding from an inner face of the first side plate, and displacement of the second coupling plates toward the inner face of the second coupling plate is restricted by outer edge portions of the second coupling plates being engaged with the restricting projection.

10. The harness guide according to claim 9, wherein the restricting projection is shaped like a rib and extends along the axial direction of the wire harness, and the second coupling plates can abut against two end portions of the restricting projection, respectively.

* * * * *